Patented Apr. 12, 1938

2,114,011

UNITED STATES PATENT OFFICE 2,114,011

ORGANIC MERCURY COMPOUNDS

Carl N. Andersen, Watertown, Mass., assignor to Lever Brothers Company, a corporation of Maine No Drawing. Application December 7, 1934, Serial No. 756,477

7 Claims. (Cl. 260—13)

The present invention relates to the production of certain new organic mercury compounds, and more particularly to aromatic mercury salts of substituted and unsubstituted unsaturated carboxylic acids.

It is an object of my invention to produce new organic mercury compounds useful as germicides and for other therapeutic purposes.

I have discovered that if the essential radical of an aromatic mercury compound consisting of an aromatic nucleus to which mercury is directly attached is introduced into an unsaturated carboxylic acid, a compound is produced which has extraordinarily high potency as an antiseptic and germicide, and at the same time is characterized by relatively low toxicity and other desirable properties.

The compounds I have prepared may be described as having the general formula $RHg.R_1$, in which R represents an aromatic structure, to a carbon atom of which the mercury is directly attached; and in which $R_1$ is represents a radical corresponding to an unsaturated carboxylic acid which is linked to the RHg group through the replacement of the hydrogen atom of the COOH group.

More particularly R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and napthyl groups.

The unsaturated carboxylic acid corresponding to the radical $R_1$, more particularly consists of an unsaturated monobasic aliphatic acid and its substituted derivatives. It includes acids in which the substituted radicals are either aromatic or aliphatic. Examples of the unsubstituted acids are acrylic acid, $CH_2:CHCOOH$, and its homologues, for example, crotonic acid, $$CH_3CH:CH.COOH.$$

The hydrogen on one or both sides of the double bond may be substituted by aliphatic radicals, for example, angelic acid, $$CH_3CH:C(CH_3)COOH;$$

or by aromatic radicals, for example, cinnamic acid, $C_6H_5CH:CHCOOH$; atropic acid, $$CH_2:C(C_6H_5)COOH;$$

and beta benzoyl acrylic acid, $$C_6H_5COCH:CHCOOH.$$

The aromatic radical itself may be substituted, for example, orthocoumaric acid, $$OHC_6H_4CH:CHCOOH.$$

In addition are included triple bond compounds such as propiolic acid and its homologues and its substituted derivatives.

In my applications, Serial Nos. 694,198 and 694,199, filed October 18, 1933, I have shown that the aromatic mercury radical may be united with an organic acid by replacing the hydrogen of the COOH group with the aromatic mercury radical. This general method may be used in preparing the above described compounds. In preparing these compounds I find that all the unsaturated acids act similarly in that the multiple bond or the substituted radicals are not disturbed. It is only the H of the COOH group which reacts under the conditions set forth. The aromatic mercury compound is preferably a hydroxide and the mechanism of the reaction is one of neutralization to form a salt and water. As pointed out in the above mentioned applications a soluble salt, such as the acetate, may be used when the aromatic mercury compound formed is relatively insoluble as compared with any of the other compounds involved in the reaction.

I have investigated many of the compounds of the above named class and a sufficient number to lead me to believe that substantially all of the unsaturated acids of the above identified group can be employed to produce my novel mercury compounds, and that the compounds so prepared have, in greater or lesser, but always in relatively high degree, desirable antiseptic and germicidal properties. I therefore regard my invention as generic to and including the entire above defined class.

The compounds may be prepared in various ways. The following specific examples are given as illustrative of the methods which may be employed in producing my novel compounds, and as illustrative of representative organic mercury unsaturated salts falling within the scope of my invention.

Example 1

17.64 grams of phenylmercury hydroxide are dissolved in 4 liters of water and heated until solution is complete. The solution is filtered to remove any gum or insoluble material. To the filtrate are added 9.76 grams of cinnamic acid dissolved in 400 cc. of 50% alcohol. A precipitate results. The mixture is set aside to cool and the precipitate then filtered and washed well with warm water and dried. The compound is phenylmercury cinnamate and melts at 178° C.

Example 2

8.82 grams of phenylmercury hydroxide are dissolved in 2 liters of water and heated until solution is complete. The solution is filtered to remove any insoluble material. To the filtrate are added 4.88 grams of atropic acid dissolved in 50 cc. of alcohol. A white crystalline precipitate separates and upon concentration of the solution more white crystals separate. The mixture is filtered and the precipitate is washed well with warm water, and dried. It is recrystallized from alcohol and melts at 68-69° C. It is the compound phenylmercury atropate.

Example 3

17.64 grams of phenylmercury hydroxide are dissolved in 4 liters of water and heated until solution is complete. The solution is then filtered to remove any insoluble material. To the filtrate are added 10.82 grams of ortho-coumaric acid dissolved in 150 cc. of alcohol. A white amorphous precipitate results. The mixture is allowed to cool after which it is filtered. The precipitate is washed well with warm water and dried. The material softens at 130° C. and melts at 195-200° C. It is the compound phenylmercury ortho-coumarate.

Example 4

17.64 grams of phenylmercury hydroxide are dissolved in 2 liters of water and heated until solution is complete. The solution is then filtered to remove any insoluble material. To the filtrate are added 12.12 grams of beta-benzoyl acrylic acid. A yellowish precipitate first results, but when the mixture is allowed to stand a white crystalline mass separates. The mixture is filtered, and the precipitate washed well with warm water and alcohol, and dried. It has a melting point of 139-141° C. The compound is phenylmercury beta-benzoyl acrylate.

Example 5

8.82 grams of phenylmercury hydroxide are dissolved in 4 liters of water and heated until solution is complete. The solution is filtered to remove any insoluble material. To the filtrate are added 30.96 grams of 90% methyl acrylate dissolved in 50% methyl alcohol. The mixture is refluxed for one hour and the solution then concentrated to one-half its original volume. Crystals separate on standing and are recovered by filtration, washed well with warm water and a few cc. of alcohol, and dried. The material is a white solid and melts at 118-120° C. It is the compound phenylmercury acrylate. In this example the ester, methyl acrylate, is hydrolized to yield methyl alcohol and acrylic acid. The acid reacts with the hydroxide to form the phenylmercury salt.

The reacting materials are employed in substantially theoretical quantities. In some instances, if desired, 10% excess of the acid may be used in order to assure the complete conversion of the phenylmercury compound.

Any suitable solvent in which the reacting components are soluble may be used as the medium for carrying out the reaction. If they are both soluble in water this is generally used for reasons of convenience, but if not other solvents such as the alcohols, acetone or mixtures of these with each other or with water, may be employed. The process may be carried out at any temperature, for example, room temperature. In most cases I find, however, that the use of heat facilitates the solution of the reaction components and speeds the reaction.

From the description of the specific examples, it will be readily apparent to one skilled in the art how other members of the above identified group may be reacted with an aromatic mercury compound to produce mercury compounds of analogous structure.

All of the compounds produced as above described are characterized by extraordinarily high potency as germicides. Tests to determine their efficacy in killing B. typhosus and Staph. aureus were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given merely as illustrative.

The figures represent the maximum dilutions at which killing in 15 minutes resulted.

|  | B. typhosus | Staph. aureus |
| --- | --- | --- |
| Phenylmercury beta-benzoyl acrylate | 1:120,000 | 1:50,000 |
| Phenylmercury ortho-coumarate | 1:50,000 | 1:25,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic compound of the general formula RHgR₁, in which R represents an aromatic structure to a carbon atom of which the mercury is directly attached and in which none of the carbon atoms has direct linkage with any elements other than hydrogen, carbon and mercury; and in which R₁ represents the radical of an unsaturated acid comprising an unsaturated acyclic linkage and containing a carboxyl group, to which radical the RHg group is linked by the replacement of the hydrogen atom of the COOH group.

2. A new organic compound of the general formula RHg.R$_1$, in which R represents an aromatic structure to a carbon atom of which the mercury is directly attached and in which none of the carbon atoms has direct linkage with any elements other than hydrogen, carbon and mercury; and in which R$_1$ represents an aromatic substituted unsaturated aliphatic acid radical to which the RHg group is linked by the replacement of the hydrogen atom of the COOH group.

3. A new organic compound of the general formula C$_6$H$_5$Hg.R$_1$, in which R$_1$ represents the radical of an unsaturated acid comprising an unsaturated acyclic linkage and containing a carboxyl group, to which radical the C$_6$H$_5$Hg group is linked by the replacement of the hydrogen atom of the COOH group.

4. A new organic compound of the general formula C$_6$H$_5$Hg.R$_1$, in which R$_1$ represents an aromatic substituted unsaturated aliphatic acid radical to which the C$_6$H$_5$Hg group is linked by the replacement of the hydrogen atom of the COOH group.

5. Phenylmercury cinnamate.
6. Phenylmercury atropate.
7. Phenylmercury ortho-coumarate.

CARL N. ANDERSEN.